Jan. 13, 1970  P. M. KINTNER  3,489,885
COUNTING INTEGRATOR FOR A.C. SIGNALS
Filed Aug. 19, 1966  2 Sheets-Sheet 1

INVENTOR.
PAUL M. KINTNER
BY Henry Huff
ATTORNEY.

United States Patent Office 3,489,885
Patented Jan. 13, 1970

3,489,885
COUNTING INTEGRATOR FOR A.C. SIGNALS
Paul M. Kintner, Huntington Station, N.Y., assignor to Cutler-Hammer, Inc., Milwaukee, Wis., a corporation of Delaware
Filed Aug. 19, 1966, Ser. No. 573,710
Int. Cl. H03k 25/02
U.S. Cl. 235—92                    10 Claims

ABSTRACT OF THE DISCLOSURE

A system for integrating a varying quantity which is represented by a voltage, by charging a capacitor during recurrent intervals in discrete increments of charge each proportional to the magnitude of the voltage existing during the respective charging interval, discharging the capacitor when the charge reaches a predetermined level, and counting the number of discharges. The voltage may be derived from an A.C. source, and varied in amplitude to represent the varying quantity. The same source controls the timing of the charging intervals to coincide with alternate half cycles of the A.C. voltage, and the timing of a sampling device which provides a brief pulse at the beginning of each charging interval of an amplitude proportional to the charge on the capacitor at that time. The pulse is amplified by a simple high gain amplifier requiring no D.C. stabilization. When the amplified pulse exceeds a preset threshold level, the capacitor is discharged through a switching arrangement that ensures that the charge will be reduced to zero.

---

Figure 1:
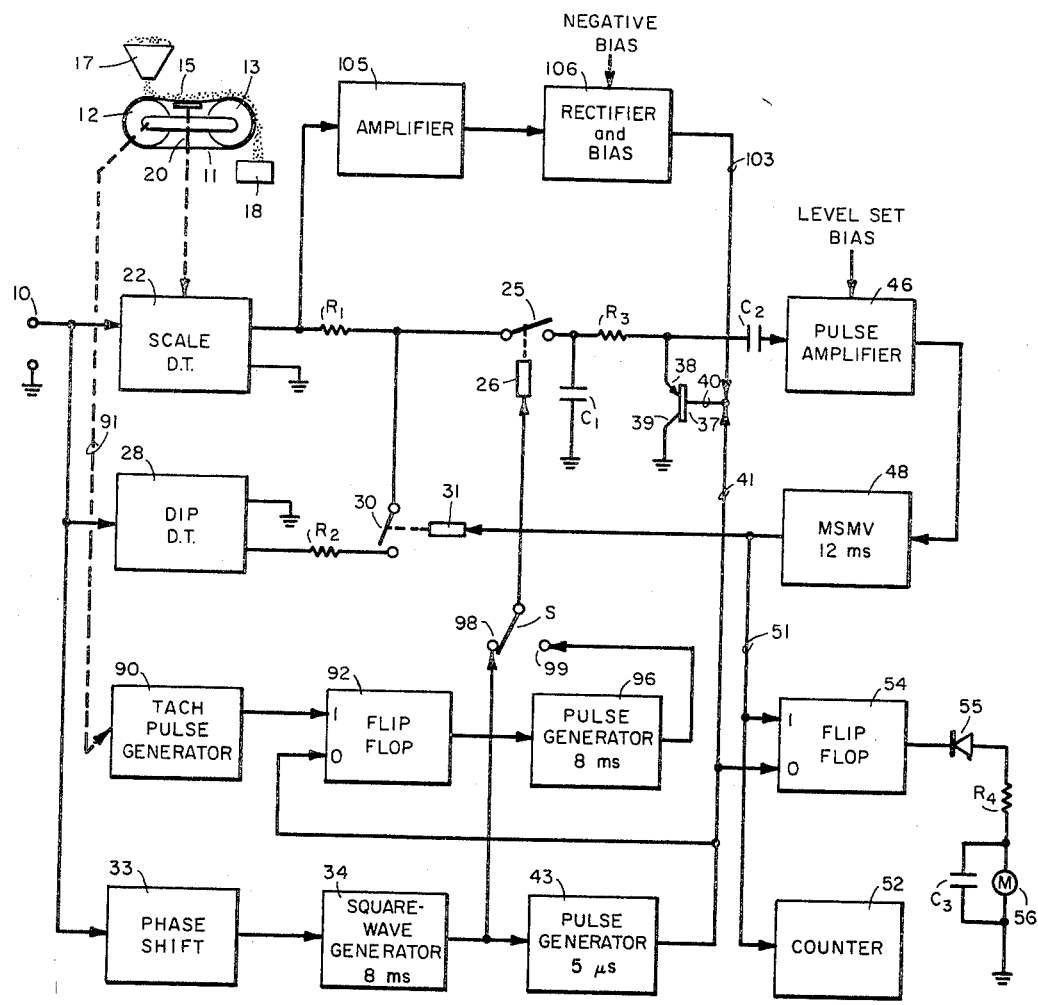

This invention relates to electronic integrating apparatus that accumulates during each one of successively occurring short time periods incremental samples of a continuous A.C. voltage signal, and which, in effect, sums the successively accumulated voltage samples over a long time period that is the total of the successively occurring shorter accumulating periods. The invention is useful in providing a summation of relatively continuous measurements of a varying quantity such as weight, and as a specific example, the invention is useful in providing a weight summation of the quantity of bulk material that is carried by a continuous conveyer belt.

In a belt weighing operation, the solid bulk material, such as coal, chemicals, or grain, is carried on the continuous conveyer belt to a storage facility or to a transporting vehicle, for example, and a weighing scale that is located at a fixed position along the belt provides a continuous indication of the loading on a unit length of the belt as the material passes that position. The scale includes a linear differential transformer whose A.C. voltage output signal is calibrated in pounds of material per unit length of conveyer belt. Assuming that the belt is moving with constant velocity, the integration of the A.C. voltage signal as a function of time provides an indication of the total weight of material carried on the belt past the weighing scale. If the conveyer belt does not move with constant velocity, the integration of the A.C. voltage may be performed as a function of actual belt movement rather than time.

One method of integrating an electrical signal involves the accumulation of incremental electrical charge samples in a storage means such as a capacitor. Such an integrator cannot operate continuously to accumulate incremental charges because the capacitor will cease to fully accumulate the incremental charges as it approaches its fully charged condition. To avoid this limitation, the capacitor may be discharged by a known amount whenever its charge reaches a reference level of voltage which is within the linear charging range of the capacitor. Now by counting the number of times that the capacitor is discharged by the known amount the total count is related to the total quantity of accumulated incremental charges, which in this example represents the quantity of material carried on the belt. This measurement technique may be likened to the measurement of the volume of water flow from a spigot by catching the water flowing from the spigot in a large tub and then dipping out the water from the tub with a one gallon pail at frequent enough intervals to prevent the tub from overflowing. A count of the number of pails of water dipped from the tub over a long time period is an accurate measure in gallons of the volume of flow from the spigot in that time period.

When the above-described type of integrator is used in a belt weighing operation, the accuracy of the weight measurement is a function of the accuracy with which the capacitor charging increments represent the true weight of the material on the scale, and of the precision of the "dip-out" operation by which the capacitor is discharged. In the present invention, accuracy in charging the capacitor as a function of material weight is assured by charging the capacitor directly with increments of the A.C. voltage output signal from the differential transformer, rather than first converting the A.C. signal to D.C. as is commonly done, thereby eliminating error and drift of voltage levels that commonly accompany D.C. circuits. The dip-out operation is carried out in a manner that minimizes leakage from the capacitor, and the charging and discharging voltages are derived from the same A.C. signal source and are routed to the capacitor through the same time-shared switch whose operation is controlled in part by said A.C. signal source, thereby assuring that the charging and discharging of the capacitor is accurately controlled in a self compensating manner.

More particularly, an input A.C. signal is coupled to a first differential transformer which is mechanically linked to the weighing scale so that the magnitude of its A.C. output signal is proportional to the weight of the material passing over the scale. The phase of this output signal bears a fixed relationship to the phase of the A.C. input signal to this differential transformer. The positive half-cycles of the output signal of this first differential transformer are coupled to an integrating capacitor through a relay whose switching action is controlled by the A.C. input signal. A second differential transformer provides a fixed magnitude A.C. output signal which is 180° out of phase with the output signal of the first differential transformer. The output of this second differential transformer is series coupled to the integrating capacitor through a second relay and the above-mentioned first relay. The accumulated charge on the integrating capacitor is sampled during a brief instant at the beginning of each positive half-cycle of the A.C. input signal and when the accumulated charge has reached a fixed reference level the second relay closes, and since the first relay also is closed during the positive half-cycle, the 180° out of phase output signal of the second differential transformer discharges the capacitor. The first relay opens at the conclusion of the positive half-cycle, thus terminating the discharge. The capacitor then commences to again accumulate incremental samples of the output signal of the first differential transformer. A counting pulse is produced each time the capacitor is discharged by the known amount, and these pulses are counted to provide an indication of the total charge that has been successively sampled by the integrating capacitor, which also is an indication of the total weight of material that has passed over the weighing scale.

Figure 2:
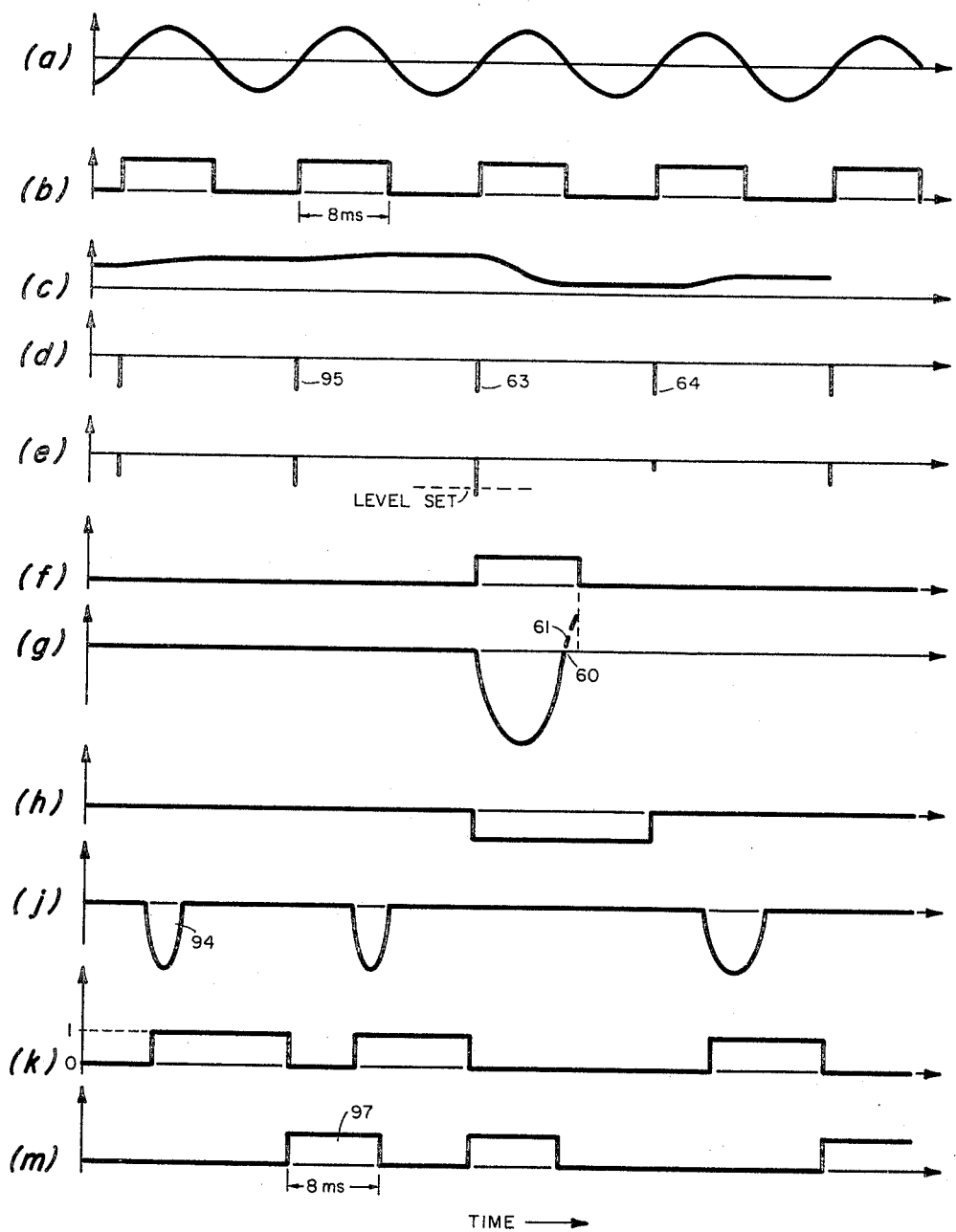

The invention will be described by referring to the accompanying drawings wherein:

FIG. 1 is a simplified diagram, predominantly in block form, of the integrator circuit of this invention; and FIG. 2 is a series of waveforms that are used in explaining the operation of the circuit of FIG. 1.

Referring now in detail to the drawings, the invention is illustrated in FIG. 1 as it might be used in a conveyer belt weighing operation. With the integrator circuit of this invention it is possible to accurately determine the total weight of a bulk material that is carried by a conveyer belt in any given period of time. A continuous conveyer belt 11 is rotated about pulleys 12 and 13, at least one of which is a driver, and a solid bulk material 15, such as coal, is dropped from a hopper 17 onto the conveyer belt 11 and is carried to a bin or transporting vehicle 18. In this initial discussion it will be assumed that belt 11 rotates at constant velocity. A weighing scale 20 is positioned at a fixed location along conveyer belt 11 and determines the weight of coal per unit length of conveyer belt as the belt passes over the scale.

Associated with scale 20 is a scale differential transformer (D.T.) 22 which might be any one of many different types, but will be assumed to be of the type that is comprised of a primary winding that is excited by an A.C. voltage and a pair of secondary windings that are connected in series opposition. A linearly translatable high permeability core controls the coupling between the primary winding and the two secondary windings, and when the core is in a null position in which the coupling to the two secondaries is equal there is no output signal from the secondaries. As the core is displaced from the null position, the output voltage increases linearly in magnitude with core displacement, and with 0° or 180° phase relative to the exciting A.C. voltage, depending upon the direction of the displacement from the null position. As illustrated in FIG. 1, the movable core is displaced by the scale 20 so that the output signal from scale D.T. 22 is proportional to the weight of coal passing over scale 20 at that instant. The exciting voltage for scale D.T. 22 is coupled from input terminal 10 and will be assumed to be a 60 cycle A.C. signal having a magnitude of several volts. The output signal of scale D.T. 22 is assumed to be of the same phase as the exciting signal and is coupled through resistor $R_1$ to the normally open contact 25 of relay 26.

Also coupled to input terminal 10 is a second differential transformer 28, labeled "dip D.T.," which differs from the scale D.T. 22 by having its translatable core fixed in position to provide an output signal which is 180° out of phase with the output signal of scale D.T. 22, and whose magnitude is a fixed predetermined voltage, as will be explained in more detail hereinafter. The output of dip D.T. 28 is coupled through resistor $R_2$ to the normally open contact 30 of relay 31.

A phase shifter 33 also is coupled to input terminal 10 and is adjustable to produce an output A.C. signal which is in phase coincidence with the output signal of scale D.T. 22. The sinusoidal waveform of FIG. 2a represents the output signal of phase shifter 33 and also of scale D.T. 22.

A square wave generator 34 receives the A.C. output signal of phase shifter 33 and produces in response thereto the square waveform of FIG. 2b which results from "squaring-off" the positive and negative excursions of the sinusoidal waveform of FIG. 2a.

The square waveform, FIG. 2b, from square wave generator 34 is coupled through contact 98 of manually operable switch S to the control coil of relay 26 and causes the relay to close the contact 25 during each positive-going pulse of the square waveform of FIG. 2b, this being a period slightly greater than 8 milliseconds per pulse. Because the positive going pulses of the waveform of FIG. 2b are in phase coincidence with the positive half-cycle of the sinusoidal output voltage of scale D.T. 22, FIG. 2a, the positive half-cycles are coupled to integrating capacitor $C_1$. The time constant of the charging path of capacitor $C_1$, this path including resistor $R_1$, is proportioned so that the actual charge applied to integrating capacitor $C_1$ during each positive half-cycle of the sinusoidal voltage is of the order of magnitude of 0.1 millivolt. With each successive half-cycle of the square waveform of FIG. 2b, relay 26 closes contact 25 and another increment of charge is added to integrating capacitor $C_1$ so that the charge on capacitor $C_1$ builds up in the manner illustrated in FIG. 2c. The charging of capacitor $C_1$ is equivalent in the above analogy to filling the tub with water flowing from the spigot.

Now that the integrating capacitor $C_1$ is being incrementally charged, means must be provided to sample the level of the charge on the capacitor to be sure that the capacitor is never permitted to become fully charged, which would be equivalent in the above analogy to permitting the tub to overflow. The sampling of the charge level on capacitor $C_1$ is accomplished by the operation of sampling transistor 37 whose emitter electrode 38 is coupled through resistor $R_3$ to the upper side of capacitor $C_1$. The collector 39 of transistor 37 is grounded and the base 40 is connected through line 41 to a pulse generator 43 which operates in response to the output of square wave generator 34 to produce short duration (5 microseconds) pulses, FIG. 2d, which are generated in response to the leading edge of each positive going pulse of the square waveform of FIG. 2b. Sampling transistor 37 normally is in its non-conducting state and the potential on its emitter electrode 38 is a voltage proportional to the charge on capacitor $C_1$, i.e., a voltage proportional to that of FIG. 2c. Upon the occurrence of a negative pulse of FIG. 2d, transistor 37 is immediately rendered conducting and the potential of emitter 38 immediately assumes ground potential. Because sampling transistor 37 is rendered conductive for only 5 microseconds, the waveform at the emitter electrode 38 will be a series of short-duration negative going pulses as illustrated in FIG. 2e. Therefore, the signals coupled through coupling capacitor $C_2$ to pulse amplifier 46 are a series of negative going sampling pulses whose amplitudes are proportional to the level of charge on integrating capacitor $C_1$.

The above-described method of sampling the voltage level across capacitor $C_1$ provides two advantageous features in the overall operation of the integrator of this invention. First, because the sampling period of 5 microseconds is extremely short relative to the period of 1 cycle of the 60 cycle excitation voltage (16,666 microseconds), the equivalent loading of the capacitor $C_1$ by the sampling circuitry is extremely high and in the example assumed is approximately equal to $$\frac{16,666}{5} \times R_3 \text{ ohms}$$

If resistor $R_3$ is given a value of 10,000 ohms, the equivalent loading resistance presented by the sampling circuit is of the order of 30 megohms. This means that very little charge is lost from integrating capacitor $C_1$ during the sampling operation, thereby assuring great accuracy in the operation of this portion of the integrator. A second important feature is that the sampling pulses are A.C. coupled to pulse amplifier 46, thereby avoiding error-inducing voltage drifts that commonly accompany D.C. circuitry.

Pulse amplifier 46 also has applied to it a level set bias voltage which prevents the amplifier 46 from passing a sampling pulse unless the magnitude of the pulse exceeds that of the level set bias. The magnitude of this level set bias is selected to assure that the accumulation of charge in capacitor $C_1$ always is substantially linear.

When the magnitude of the charge on capacitor $C_1$ (FIG. 2c) exceeds the predetermined magnitude required to overcome the level set bias applied to pulse amplifier 46, a sampling pulse is passed by amplifier 46 and actuates monostable multivibrator 48 which produces a positive going output pulse, FIG. 2f, whose duration is approximately 12 milliseconds, this being slightly longer than a half-cycle of the sinusoidal waveform of FIG. 2a, and therefore also slightly longer in duration than a positive going pulse of the square waveform of FIG. 2b which controls the closing of relay 26. The 12 milliseconds output from multivibrator 48 is coupled to the actuating coil of relay 31 which then closes the contact 30 so as to couple the output signal of dip D.T. 28 through resistor $R_2$, contact 30 of relay 31, contact 25 of relay 26, to the upper side of integrating capacitor $C_1$. By referring to FIGS. 2b and 2f it will be seen that relay 31 closes contact 30 substantially at the same time that contact 25 is closed by relay 26. As was previously mentioned, the output signal of dip D.T. 28 is 180° out of phase with the output voltage of scale D.T. 22, which means that the dip D.T. 28 will be coupled to integrating capacitor $C_1$ during the negative half-cycle of its output voltage waveform. The magnitude of the negative half-cycle of the output voltage of dip D.T. 28 is proportioned to substantially completely discharge integrating capacitor $C_1$. This is equivalent to dipping out one gallon of water from the tub in the analogy given above. Following the dip out just described, capacitor $C_1$ again will begin to accumulate charge in the manner illustrated in FIG. 2c, and this accumulated charge will be repeatedly sampled by the sampling transistor 37 until a sampling pulse exceeds the level set bias on pulse amplifier 46, at which time the discharging of capacitor $C_1$, i.e. the dip out, again will take place.

The above-described feature of coupling the output voltage of dip D.T. 28 to integrating capacitor $C_1$ through the contact 25 of relay 26 is designed to further assure extreme accuracy in the charging and discharging, or filling and dipping out, of capacitor $C_1$. Because the closing of relay 26 is controlled by the positive going pulses of the square waveform of FIG. 2b, which are in turn synchronized with the positive half-cycles of the output voltage waveform of scale D.T. 22, the discharge of capacitor $C_1$ always will terminate before the output waveform of dip D.T. 28 can go positive, which would result in adding an erroneous incremental charge to capacitor $C_1$. This operation is illustrated in the waveforms of FIG. 2, wherein FIG. 2f is the 12 millisecond output of multivibrator 48, and FIG. 2g is a negative half-cycle of the output voltage of dip D.T. 28. If the waveform of FIG. 2g were not disconnected from capacitor $C_1$ at precisely the zero crossover point 60, the waveform might go positive, as at 61, and begin charging capacitor $C_1$. This charge would be completely unrelated to the weight of material passing over scale 20 and would represent an error. It thus is seen that by allowing relay 26 to control both the charging and the discharge of capacitor $C_1$, a source of possible error is eliminated. No great error is possible in the timing of the closing of relay 31 to connect dip D.T. 28 to capacitor $C_1$ since it is a relatively simple task to provide circuits and components such as multivibrator 48 and relay 31 whose initial response may be accurately controlled. However, the precise turnoff of these circuits and components cannot easily be assured without taking relative complicated and expensive measures. It is well known that different relays, even of the same type, will not always open at the same time following the termination of an actuating pulse that closes the relay contacts. Although two relays, 26 and 31, are used in the present circuit, the above-described possible discrepancy in opening times will be of no concern because essentially only relay 26 controls the charging and discharging of integrating capacitor $C_1$. This simplifies the circuitry and assures great accuracy in the control of the charging and discharging of capacitor $C_1$ with relatively inexpensive relays and circuits.

A further advantage is gained by charging and discharging the integrating capacitor $C_1$ with sinusoidal voltage waveforms that are both derived from the same A.C. input voltage. Should the voltage level of the input voltage on input terminal 10 vary in magnitude, the incremental charges accumulated in capacitor $C_1$ will likewise vary in magnitude, thus changing the rate of charging of capacitor $C_1$. However, because the discharging voltage from dip D.T. is derived from the same source and is 180° out of phase with the charging voltages, the discharging waveform will have changed in magnitude by the same amount but of opposite sense so as to automatically compensate for any difference in the rate of charging of capacitor $C_1$. The same compensating feature will apply in the event that the exciting A.C. voltage on input terminal 10 varies in frequency.

Each time a dip out signal, FIG. 2f, is produced by monostable multivibrator 48, a signal corresponding to that of FIG. 2f is coupled over line 51 to a counter device 52 which provides an indication of the total number of dip-out signals that have been generated. Because each dip-out signal represents a certain weight of bulk material that has passed over scale 20, the total count in counter 52 is an indication of the total weight of material carried by conveyer belt 11 across weighing scale 20. In terms of the integrator operation, the count registered in counter 52 represents the integration of the incremental charges supplied from scale D.T. 22 to integrating capacitor $C_1$.

In the circuitry of FIG. 1, means also are included for providing an indication of the rate of material flow per unit time over the scale 20. This function is provided as follows. A flip-flop 54 receives the 12 millisecond dip out pulse, FIG. 2f, from multivibrator 48 and also the 5 microsecond output pulses, FIG. 2d, from pulse generator 43. Flip-flop 54 normally is in its 0 state in which its 1 output terminal is non-conducting. A 5 microsecond pulse from pulse generator 43 sets flip-flop 54 in its 0 state. Referring to the waveforms of FIG. 2 it may be seen that the sampling pulse 63 of FIG. 2d and the dip out pulse of FIG. 2f are applied simultaneously to the respective inputs of flip-flop 54. The dip out pulse of FIG. 2f is longer in duration than sampling pulse 63 and its magnitude is proportioned so that it has an overriding effect to set flip-flop 54 in its 1 state which renders its 1 terminal conductive, thereby providing a charging current that flows from ground, through a storage capacitor $C_3$, resistor $R_4$, and diode 55, thereby charging capacitor $C_3$ to a fixed level determined by the magnitude of the output pulse on the 1 terminal of flip-flop 54. Flip-flop 54 remains in its 1 state, FIG. 2h, until the occurrence of the next succeeding 5 microsecond pulse 64 of FIG. 2d from pulse generator 43, this pulse then resetting flip-flop 54 to its 0 condition and terminating the signal on the one output terminal of flip-flop 54. A meter 56 is connected across storage capacitor $C_3$ and the diode 55 prevents leakage of charge from capacitor $C_3$. The discharge of capacitor $C_3$ will be through meter 56. Because the charging current for capacitor $C_3$ is maintained at a precise level, FIG. 2h, the average current through meter 56 will be a function solely of the rate at which capacitor $C_3$ is charged, that is, the rate at which the dip-out pulses of FIG. 2f are produced. Meter 56 therefore provides an indication of the weight per unit time of material flow across weighing scale 20.

The above discussion assumed that the continuous conveyer belt 11 was traveling at a constant velocity, and the circuitry performed an integration operation as a function of time. In some instances conveyer belt 11 may not travel at constant velocity, in which case it is necessary that the charging of integrating capacitor $C_1$ be a function of belt movement rather than time. This is accomplished in the following manner. A tachometer pulse generator 90 is coupled by means of a mechanical linkage 91 to the driven pulley 12. Tachometer pulse generator 90 produces output pulses, such as illustrated in FIG. 2j, which occur at a rate that is a function of the velocity of conveyer belt 11. These tachometer pulses are applied to the 1 input terminal of flip-flop 92 and the 5 microsecond output pulses, FIG. 2d, of pulse generator 43 are applied to the 0 input of flip-flop 92. The coupling of a tachometer pulse, such as pulse 94 of FIG. 2j, to the one input terminal of flip-flop 92 sets that flip-flop in its 1 state, as illustrated in FIG. 2k. The flip-flop remains in this state until the occurrence of the next succeeding 5 microsecond pulse from pulse generator 43, that is, pulse 95 of FIG. 2d, whereupon flip-flop 92 is reset to its 0 state. The return of flip-flop 92 to its 0 state actuates pulse generator 96 which responds thereto to produce the pulse 97 of FIG. 2m. The durations of the positive-going pulses of the waveforms of FIGS. 2b and 2m are equal. By following through the waveforms 2d, 2j, 2k, and 2m, it will be seen that each tachometer pulse sets flip-flop 92 to its 1 state and that the next succeeding 5 microsecond pulse from pulse generator 43 resets the flip-flop to its 0 state, this reset always occurring in synchronism with the positive going zero crossover point of the 60 cycle exciting voltage on input terminal 10. Therefore, the positive going output pulses of pulse generator 96, when they occur, are synchronized with the positive going pulses in the output from square wave generator 34, as may be seen by comparing waveforms of FIGS. 2b and 2m. In the event that no tachometer pulse, FIG. 2j, occurs intermediate two 5 microsecond pulses of FIG. 2d, flip-flop 92 will remain in its 0 state and no 8 millisecond pulse of FIG. 2m will be produced by pulse generator 96. This type of operation is illustrated in FIGS. 2d, 2j, 2k, and 2m wherein it is seen that no tachometer pulse occurs in FIG. 2j in the time interval between pulses 63 and 64 of FIG. 2d. Consequently, a positive going pulse is missing in the time interval between the second and third pulses in the waveform of FIG. 2m.

In this tachometer controlled mode of operation the movable contact of switch S is moved from contact 98 to contact 99 on the output of pulse generator 96 and now the closing of contact 25 of relay 26 is controlled by the output of pulse generator 96. The operation of the integrator circuit is essentially the same as previously described even though belt 11 may not be traveling at a constant velocity.

Conveyer belt 11 most likely will be made of a flexible material and will be supported along its length at spaced positions by rollers. Consequently, when the belt is running empty it is likely that it will vibrate and ripple as it passes over weighing scale 20, thus giving rise to false output signals from scale D.T. 22. Unless steps are taken to eliminate these false signals they will be integrated in the same manner as described above, and in the event that the belt runs empty for a long time, these false signals can be the source of an appreciable error in the count registered in counter 52.

The amplifier 105 and rectifier and bias circuit 106, which are serially connected to the output of scale D.T. 22, are provided to eliminate the errors that arise when the belt runs empty. A.C. amplifier 105 amplifies the output signal from scale D.T. 22 and provides a signal which is rectified to a positive D.C. voltage in rectifier and bias circuit 106. Circuit 106 also receives a negative bias voltage as an input signal, and operates to match or compare the magnitudes of the rectified positive voltage and the negative bias voltage. If the positive voltage is larger, the output of circuit 106 is a positive bias voltage that is coupled over lead 103 to the base electrode 40 of sampling transistor 37. This positive voltage is proportioned to hold transistor 37 in the non-conducting state, but will permit the 5 microsecond pulses from pulse generator 43 to turn the transistor on so that sampling pulses may be generated. If the negative bias voltage supplied to circuit 106 is greater in magnitude than the rectified positive voltage, the output on lead 103 will be a negative bias voltage which will hold sampling transistor 37 in its conducting state. The magnitudes of the rectified positive voltage and negative bias voltage are chosen so that sampling transistor 37 will conduct when the output signal of scale D.T. 22 falls below a voltage that represents approximately 5 or 10 percent, for example, of the capacity loading on conveyer belt 11. Thus when the weight on the belt is below this chosen minimum limit, switching transistor will be conducting continuously which has the effect of preventing the generation of sampling pulses, thereby preventing any further dip-out operations, and additionally, integrating capacitor $C_1$ will be completely discharged through switching transistor 37, thereby further disabling the integrator. As a result of this action, the false zero-load signals from scale D.T. 22 cannot influence the count in counter 52.

While the invention has been described in its preferred embodiments, it is to be understood that the words which have been used are words of description rather than of limitation and that changes within the purview of the appended claims may be made without departing from the true scope and spirit of the invention in its broader aspects.

I claim:
1. Apparatus for integrating a function with respect to an independent variable, said function being represented by a variable magnitude signal, comprising
   an accumulating storage means,
   a normally open signal connecting means,
   means for producing a store command signal upon each change of said independent variable by a predetermined increment,
   means responsive to each store command signal for closing said signal connecting means for an incremental time period,
   means for applying said variable magnitude signal to said storage means through said closed signal connecting means,
   each closing of said signal connecting means operating to store an incremental sample of said variable magnitude signal in said storage means, whereby successive closings of said signal connecting means causes incremental samples of the variable magnitude signal to accumulate in the storage means,
   means responsive to the magnitude of the accumulated samples in the storage means to produce a dip-out command signal when the accumulated samples reach a predetermined magnitude,
   a source supplying a dip-out signal,
   means responsive to said dip-out command signal for coupling said dip-out signal through said signal connecting means to said storage means to remove a given quantity of accumulated samples from said storage means during one of said incremental time periods, and
   means for counting the dip-out command signals.

2. The apparatus claimed in claim 1, further including
   means for providing an A.C. exciting voltage, said variable magnitude signal being an A.C. signal produced from said exciting voltage, and
   means for energizing said dip-out signal source with said exciting voltage to produce an A.C. dip-out signal substantially in phase opposition to said variable magnitude signal and of an amplitude sufficient to substantially completely discharge said storage means during one of said incremental time periods.

3. Apparatus for integrating a function with respect to an independent variable, said function being represented by a variable voltage signal, comprising
   a capacitor,
   a normally open switch,
   means for producing a fill command signal upon each change of said independent variable by a predetermined increment,
   means responsive to each fill command signal for closing said switch for an incremental time period,
   means for applying said variable voltage signal to said capacitor through said closed switch,
   each closing of said switch operating to charge said capacitor by an incremental amount which is a function of the magnitude of said variable voltage signal, whereby successive closings of said switch accumulates voltage samples across said capacitor,
a source of discharge voltage,
means including a second normally open switch serially connected between said first switch and the source of discharge voltage,
means responsive to the accumulated voltage across said capacitor to produce a dip-out command signal when said accumulated voltage reaches a predetermined magnitude,
means responsive to said dip-out command signal to close said second switch approximately coincidentally with a closure of said first switch and to keep said second switch closed at least until after said first switch is opened, thereby to move a quantity of charge from said capacitor, and
means for counting said dip out command signals.

4. The invention set forth in claim 3, wherein
said means for producing a dip-out command signal includes means for sampling said voltage across said capacitor by producing a capacitor sampling pulse substantially coincidentally with the beginning of each fill command signal, and trigger means responsive to a sampling pulse exceeding a predetermined amplitude to initiate a dip-out command signal.

5. The invention set forth in claim 4 wherein
said variable voltage signal and said discharge voltage are alternating signals in phase opposition to each other, and said means for producing a fill command signal includes means for producing a pulse beginning substantially coincidentally with a zero crossover in one direction of said variable voltage signal and terminating substantially coincidentally with the next subsequent zero crossover of said variable voltage signal.

6. The combination claimed in claim 5 wherein
said variable voltage signal and said discharge voltage are both derived from the same alternating input signal and the magnitudes of said variable voltage signal and said discharge voltage are each a function of the magnitude of said alternating input signal.

7. The combination claimed in claim 6 and further including means operable in response to said variable voltage signal to disable said means to produce sampling pulses when the magnitude of said variable voltage signal is below a predetermined magnitude.

8. The combination claimed in claim 6 wherein
said means for producing a fill command signal is a square wave generator responsive to said alternating input signal, said fill command signals being comprised of alternately occurring half-cycles of a square waveform output from the square wave generator.

9 The combination claimed in claim 6 wherein said means for producing a fill command signal is means responsive to the rate of change of said independent variable.

10. The combination claimed in claim 6 which includes,
a linear variable differential transformer excited by said alternating input signal and responsive to a mechanical signal corresponding to said function to produce said variable voltage signal.

References Cited

UNITED STATES PATENTS

| | | | |
|---|---|---|---|
| 2,543,491 | 2/1951 | Froman | 235—92 |
| 2,903,185 | 9/1959 | Myers | 235—183 |
| 3,104,318 | 9/1963 | Hill et al. | 235—183 |
| 3,256,426 | 6/1966 | Roth et al. | 235—183 |
| 3,368,149 | 2/1968 | Wasserman | 324—99 |

DARYL W. COOK, Primary Examiner

JOSEPH M. THESZ, Jr., Assistant Examiner

U.S. Cl. X.R.

235—183; 340—347